(12) United States Patent
Sliwa

(10) Patent No.: US 11,479,315 B1
(45) Date of Patent: *Oct. 25, 2022

(54) UNIVERSAL MOTORCYCLE STORAGE CASE MOUNTING ASSEMBLY

(71) Applicant: Francis S. Sliwa, Tampa, FL (US)

(72) Inventor: Francis S. Sliwa, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/946,357

(22) Filed: Jun. 18, 2020

Related U.S. Application Data (63) Continuation-in-part of application No. 16/037,865, filed on Jul. 17, 2018, now Pat. No. 11,027,791, which is a continuation of application No. 15/792,302, filed on Oct. 24, 2017, now Pat. No. 10,065,698.

(51) Int. Cl.
| | |
|---|---|
| *B62J 9/20* | (2020.01) |
| *B62J 1/28* | (2006.01) |
| *A45C 5/14* | (2006.01) |
| *A45C 15/00* | (2006.01) |
| *A45C 13/38* | (2006.01) |
| *A45C 13/26* | (2006.01) |

(52) U.S. Cl.
CPC ...... *B62J 9/20* (2020.02); *A45C 5/14* (2013.01); *A45C 13/385* (2013.01); *A45C 15/00* (2013.01); *B62J 1/28* (2013.01); *A45C 2013/267* (2013.01)

(58) Field of Classification Search
CPC ............ B62J 9/20; B62J 9/001; B62J 9/006
USPC .......................................... 224/413
See application file for complete search history.

(56) References Cited

U.S. PATENT DOCUMENTS

| | | | | |
|---|---|---|---|---|
| 5,558,260 A | * | 9/1996 | Reichert | B62J 1/14 224/413 |
| 6,345,414 B1 | * | 2/2002 | Chen | A45C 5/14 16/113.1 |
| 11,027,791 B1 | * | 6/2021 | Sliwa | B62J 9/20 |

* cited by examiner

*Primary Examiner* — Corey N Skurdal
(74) *Attorney, Agent, or Firm* — Owen Behrens; Paul Murty; Smith & Hopen, P.A.

(57) ABSTRACT

A universal motorcycle storage case mounting assembly that detachably secures to a motorcycle or other vehicle, allowing a user to safely transport personal belongings to a destination. The mounting assembly utilizes two main components—a base frame and a platform, with a storage case being couplable to the platform, forming a transportable storage case. In order to secure to a motorcycle or other vehicle, the mounting assembly utilizes a triple-locking system, including a base latch bracket that attaches to the motorcycle; a receipt on the platform; and a platform latch bracket, the receipt and the platform latch bracket configured to secure the platform to the base frame. As a result of the locking system, the storage case requires force to detach from the motorcycle, thereby preventing inadvertent detachment. Upon arrival at a destination, a rider can detach the transportable storage case, rather than leave belongings on the motorcycle.

16 Claims, 10 Drawing Sheets

UNIVERSAL MOTORCYCLE STORAGE CASE MOUNTING ASSEMBLY

CROSS-REFERENCE TO RELATED APPLICATIONS

This nonprovisional application is a continuation-in-part of and claims priority to nonprovisional application Ser. No. 16/037,865, entitled Universal Motorcycle Storage Case Mounting Assembly," filed on Jul. 17, 2018, by the same inventor, which is a continuation of and claims priority to nonprovisional application Ser. No. 15/792,302, entitled "Universal Motorcycle Storage Case Mounting Assembly," filed on Oct. 24, 2017 and issued as U.S. Pat. No. 10,065,698 on Sep. 4, 2018, by the same inventor.

BACKGROUND OF THE INVENTION

1. Field of the Invention

This invention relates, generally, to a universal motorcycle storage case mounting assembly. More specifically, it relates to detachably-mounted storage case and bracket assembly that is couplable to a motorcycle through a triple-locking system, allowing a user to travel with a storage case that can easily detach from the motorcycle upon arrival at a destination.

2. Brief Description of the Prior Art

When traveling to a destination, it is often desirable to bring a storage case, such as a suitcase, to store clothing and other necessities. Typically, suitcases can be easily stored and transported in a vehicle, such as in the trunk or on the backseat of a car, and are capable of being removed from the vehicle upon arrival at a destination. However, due to the compact nature and lack of storage space of a motorcycle or bicycle, it is difficult for a rider to embark on a long journey with a traditional suitcase. Currently, the rider can store clothing and other necessities in a compartment under the seat; however, the rider is typically incapable of bringing a typical suitcase on the journey, because a suitcase cannot fit in the storage space under the seat. Furthermore, the rider must remove and replace the seat each time the rider accesses the contents of the compartment, which is time-consuming and inefficient.

Efforts have been made to provide for the use of removable storage cases with a motorcycle. For example, saddlebags may be used to provide storage on the sides of the motorcycle. Some saddlebags are permanently attached to the motorcycle, which can prevent the rider from removing the bag upon arrival at the destination, forcing the rider to unpack the bag outside of a destination, such as a house or a hotel. Other saddlebags are removably attachable to the motorcycle via straps and buckles that rest underneath the seat; however, the straps and buckles may not be secure against the motorcycle, which can lead to the bags falling off the motorcycle during travel. Such a design can be extremely dangerous for the rider, as well as other travelers on the road, if the bags slip off the motorcycle in the middle of a busy road.

Accordingly, what is needed is a universal motorcycle storage case mounting assembly that allows for a storage case to be detachably coupled to a motorcycle, such that a rider can secure a suitcase to a motorcycle and easily remove the suitcase from the motorcycle upon reaching a destination. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a detachably-mounted case and a corresponding frame for use with a motorcycle or other vehicle is now met by a new, useful, and nonobvious invention.

The novel universal motorcycle storage case mounting assembly includes a base frame and a platform. The base frame includes a base latch bracket that is operably configured to securely attach to a motorcycle at a male attachment point. The base latch bracket is pivotably coupled to the base frame, allowing a female receipt to clamp against the male attachment point. One or more base latch brackets may be coupled to the base frame. The base frame may be sized and shaped to be installed aft of a motorcycle seat. The base frame also includes a vertical strut that extends in a direction away from the base frame, with the vertical strut including a bushing that may couple to the platform. The platform includes an upper surface opposite a lower surface, and a pair of opposing sidewalls extending perpendicularly away from the lower surface, with at least one receipt defined by each of the pair of opposing sidewalls. The at least one receipt at least partially enclosed by a platform latch bracket.

In an embodiment of the present invention, the platform is removably couplable to the base frame, attaching to the base frame though a platform latch bracket. A female receipt of the platform latch bracket may receive and retain a bushing on the base frame. One or more platform latch brackets may be coupled to the platform. The platform may include one or more receipts that are sized and shaped to receive and retain a bushing on the base frame. Since the mounting assembly may utilize a base latch bracket, a platform latch bracket, and aperture receipt, it may form a locking system including three separate components for securing a storage case to a vehicle.

The platform may further include a wheeled end including one or more wheels, and a handle end opposite the wheeled end. The handle end may include a pull bar that exists in a parallel plane with respect to the platform. The pull bar may be telescopable with respect to the platform, either directly or indirectly. An upper surface of the platform may be disposed between the wheeled end and the handle end. The platform may also include a bench extending in a direction away from a motorcycle seat.

In one embodiment, a storage case may be detachably couplable to the upper surface of the platform, forming a transportable storage case assembly that is detachable from the base frame, such that the platform and the storage case may be detachably couplable to the base frame. The storage case may include a set of exterior walls defining an interior storage compartment, and may include a set of caster wheels, with each caster wheel being collinear with a wheel of the platform. Said another way, a reasonably straight line may be drawn between each caster wheel and a wheel of the platform.

The universal motorcycle storage case mounting assembly may be used in a method of securing a detachable storage case to a motorcycle. The base frame may be attached to the motorcycle by clamping a base latch bracket against a male attachment point on the motorcycle. Similarly, the platform may couple to the base frame by clamping a platform latch bracket against a bushing on the base frame, and by retaining a bushing within aperture receipt of the platform. A storage case may be detachably coupled to an upper surface of the platform, thereby forming a transportable storage case assembly that is detachable from the base frame, allowing a user to safely and securely transport the storage case to a destination.

An object of the invention is to provide a secure attachment for a storage case and a vehicle, such as a motorcycle, which safely and efficiently allows a user to transport a storage case to a destination, and to detach the storage case from the motorcycle upon arrival at the destination, rather than being forced to leave the storage case on the motorcycle.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a universal motorcycle storage case mounting assembly that allows for the secure transportation of a storage case, such as a bag or a suitcase, to a destination. An advantage of the mounting assembly is the use of a platform that is detachably coupled to a base frame that is attached to a vehicle, such as a motorcycle. As a result, a rider can easily detach a storage case from the motorcycle upon arrival at a destination, allowing the rider to travel with clothing and other personal items. Moreover, rather than using a saddlebag that is attached to a motorcycle through belts and/or buckles, the present invention provides for a secure connection between the platform and the base frame through a triple-locking system, including pivoting latches that lock the components together during transportation. Accordingly, the present invention prevents the inadvertent detachment of the platform from the base frame, thereby securing the storage case to the motorcycle.

Figure 1A:
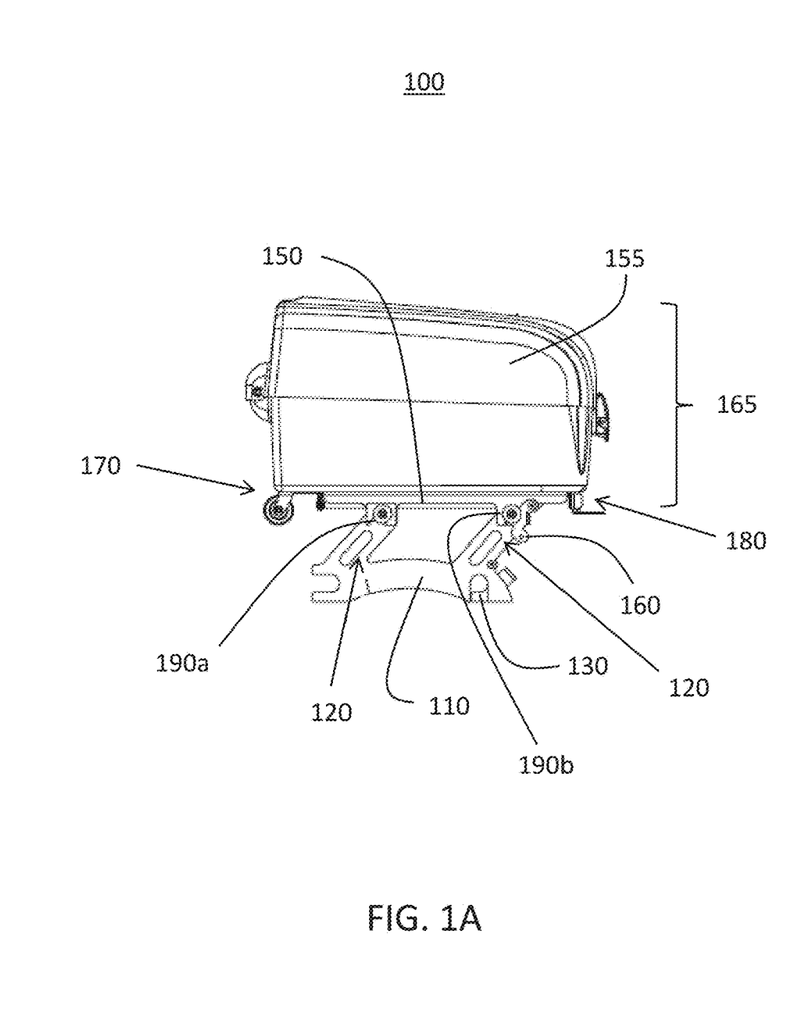
FIG. 1A is an elevational view of a universal motorcycle storage case mounting assembly, with a storage case detachably coupled to a base frame, in accordance with an embodiment of the present invention.
Figure 1B:
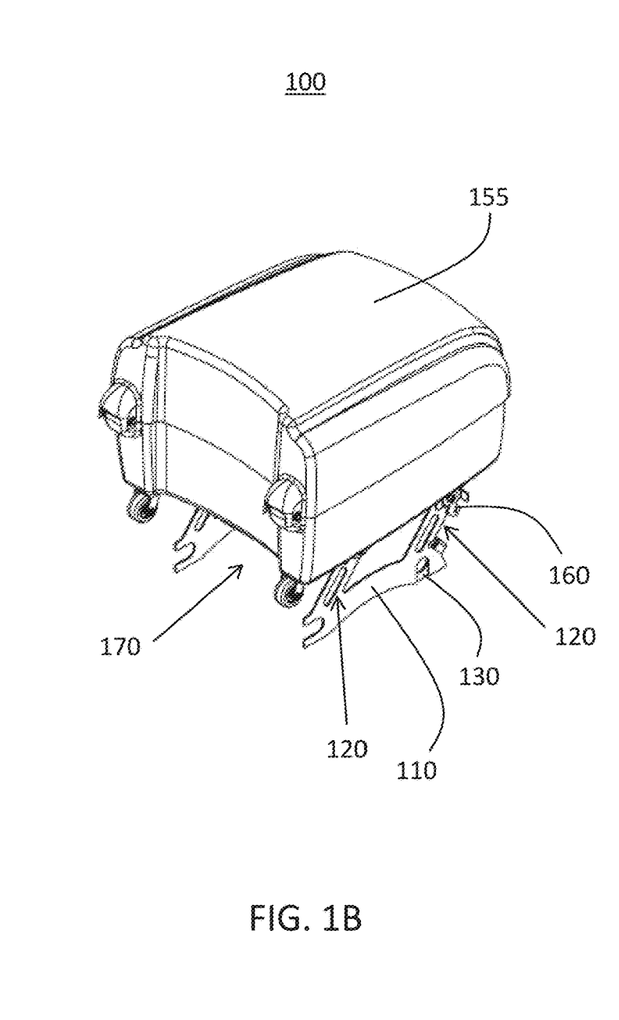
FIG. 1B is a perspective view of the universal motorcycle storage case mounting assembly of FIG. 1A.

As shown in FIGS. 1A and 1B, motorcycle storage assembly 100 includes base frame 110 comprising of a pair of vertical struts 120. The lower ends of the vertical struts are configured to engage motorcycle mounts, while the upper ends engage platform 150. Vertical struts 120 may be operably configured to attach to any attachment point on a vehicle, such as a motorcycle, bicycle, unicycle, tricycle, car, truck, van, or any other vehicle. In one embodiment, struts 120 include at least one base latch bracket 130 that pivotably attached to base frame 110. Base latch bracket 130 is adapted to secure strut 120 to a motorcycle by receiving and retaining a mount on the motorcycle.

In an embodiment, base frame 110 is installed aft of a motorcycle seat and substantially above a rear tire of a solo-seat motorcycle, with the motorcycle seat being disposed between base frame 110 and a front tire. As such, base frame 110 may be installed at a position that is behind the rider, such that items may be stored behind the rider during use. Because base latch bracket 130 only requires an attachment point to secure to the motorcycle, base frame 110 may be installable on a variety of motorcycles, other vehicles, and other surfaces, provided that an attachment point exists on that surface. As such, base frame 110 makes universal motorcycle storage case mounting assembly 100 substantially universal in its potential use, since it is capable of being installed across a variety of motorcycles, vehicles, and surfaces.

Figure 2:
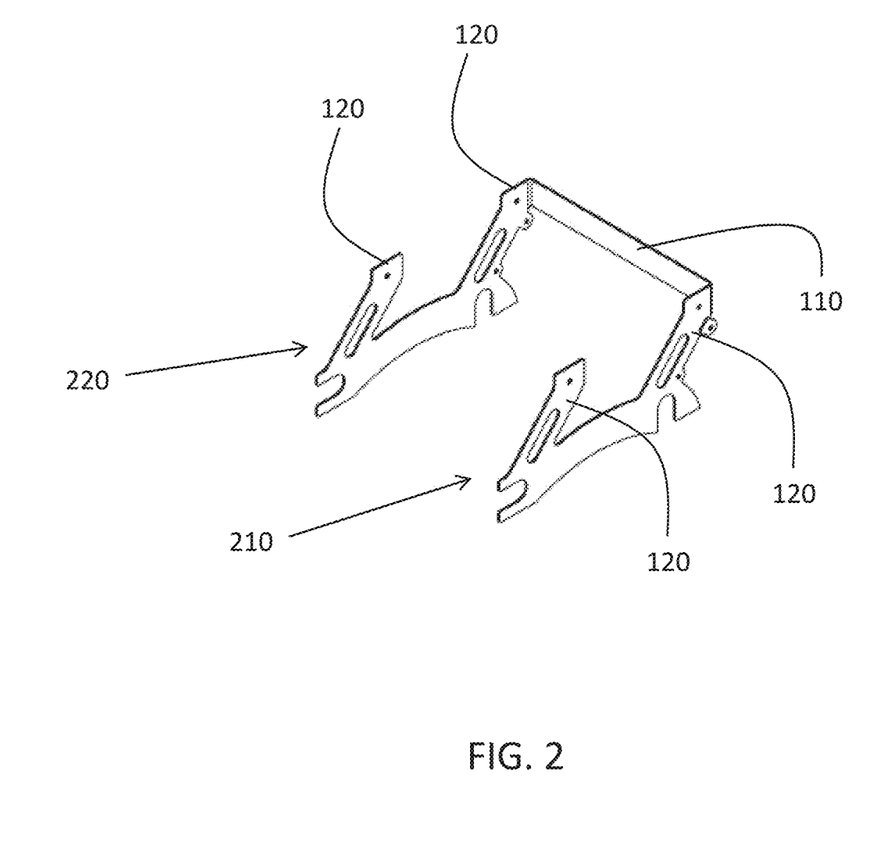
FIG. 2 is a perspective view of a base frame, a component of the universal motorcycle storage case mounting assembly of FIG. 1A.

Base frame 110 is shown in greater detail in FIG. 2, depicting that it includes first side 210 opposite second side 220. In an embodiment, first side 210 attaches to a first side of a motorcycle, and second side 220 attaches to a second side of a motorcycle. In a preferred embodiment, base frame 110 measures approximately 13" (±1.5") from first side 210 to second side 220, allowing base frame 110 to be installed on opposite sides of a motorcycle frame. However, it is appreciated that other measurements are possible for other uses of base frame 110.

Referring again to FIGS. 1A and 1B, vertical struts 140 includes a plurality of flanged bushings 190*a*, 190*b* that may be utilized as male members to couple base frame 110 to platform 150, which may be another component of universal motorcycle storage case mounting assembly 100. In a preferred embodiment, flanged bushings 190*a*, 190*b* may be separated by a distance of approximately 10" (±1.5"); however, it is appreciated that for other uses, flanged bushings 190*a*, 190*b* may be further apart.

In an embodiment, universal motorcycle storage case mounting assembly 100 includes platform 150. Platform 150 includes at least one platform latch bracket 160, which may be sized and shaped to receive and retain one of flanged bushings 190*a*, 190*b*. For example, left platform latch bracket 160 may pivot to securely retain flanged bushing 190*b*, as shown in FIGS. 1A-1B. As such, platform 150 may be detachably couplable to base frame 110, since it may freely attach to and detach from base frame 110, locking against base frame 110 when left platform latch bracket 160 pivots to retain flanged bushing 190*b*.

As shown in FIGS. 1A and 1B, platform 150 may include wheeled end 170 opposite handle end 180. In an embodiment, storage case 155 is detachably coupled to platform 150; when they are coupled, storage case 155 and platform 150 may form transportable storage case assembly 165. Transportable storage case assembly 165 may secure to and detach from base frame 110, allowing a user to easily transport storage case 155 to a destination, without having to leave storage case 155 on a motorcycle upon arrival at the destination.

Figure 3:
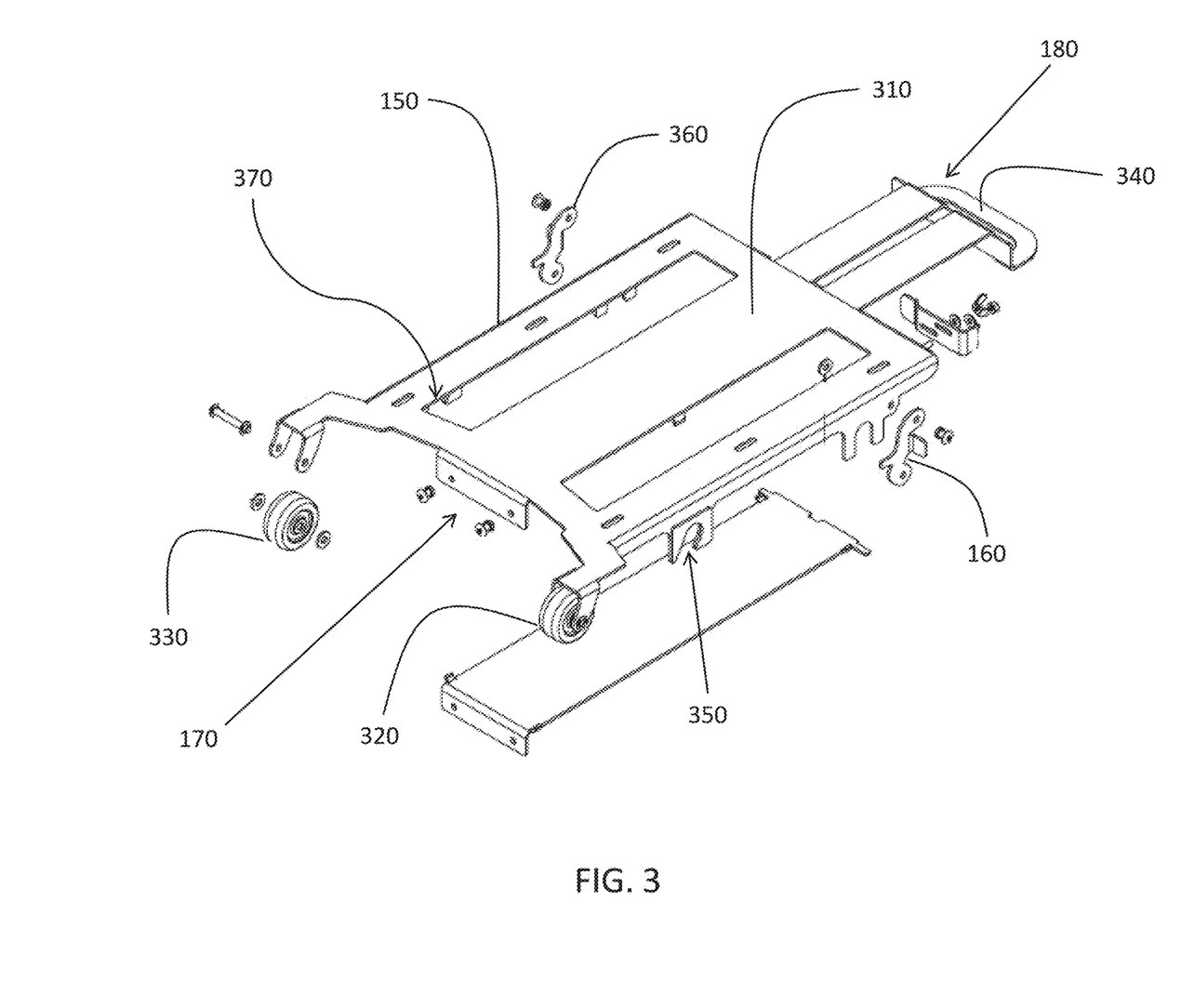
FIG. 3 is an exploded perspective view of a platform, a component of the universal motorcycle storage case mounting assembly, that is detachably couplable to the base frame of FIG. 2.

Platform 150 is shown in greater detail in FIG. 3. In an embodiment, platform 150 includes top surface 310 that is operably configured to couple with storage case 155 during use. Platform 150 may include wheels at wheeled end 170, such as first wheel 320 and second wheel 330, allowing platform 150, as well as storage case 155 when attached to platform 150, to be transportable along a ground surface. In an embodiment, platform 150 includes wheels at handle end 180, or disposed opposite top surface 310 and oriented in a ground-surface-facing direction. As such, even if storage case 155 does not include a wheel, platform 150 may provide for easy and efficient transportation of personal items stored within storage case 155. To further facilitate ease of transportation, platform 150 may include pull bar 340 at handle end 180. Pull bar 340 may be directly or indirectly telescopable with respect to platform 150 and top surface 310, with pull bar 340 operably configured for translational motion along a plane that is parallel to the plane defined by top surface 310. In an embodiment, pull bar 340 may include a hinge, allowing pull bar 340 to telescope in a direction away from wheeled end 170, and pivot to be perpendicular with respect to top surface 310. Alternatively, handle end 180 may include a flexible strap as a handle, allowing a user to transport platform 150 without the need to extend a pull bar or utilize wheels.

FIG. 3 also depicts components of the locking mechanism of universal motorcycle storage case mounting assembly 100 in detail. Platform 150 may include left platform latch bracket 160 and right platform latch bracket 360. Each platform latch bracket 160, 360 may be pivotably coupled to platform 150, such that each platform latch bracket 160, 360 may receive and retain one of the plurality of flanged bushings 190 of base frame 110, as shown in FIG. 1. For example, when left platform latch bracket 160 receives flanged bushing 190*b*, left platform latch bracket 160 may be pivoted in a clockwise direction with respect to platform 150, thereby retaining flanged bushing 190*b* against platform 150. Similarly, platform latch bracket 360 may receive and retain one of the plurality of flanged bushings 190. It is appreciated that a singular platform latch bracket, such as left platform latch bracket 160, may be used to lock platform 150 against base frame 110; however, multiple platform latch brackets may be used. Likewise, while FIG. 3 shows left platform latch bracket 160 being pivotably connected to platform 150 such that left platform latch bracket 160 pivots in a clockwise direction, it is appreciated that left platform latch bracket 160 may be coupled such that it would pivot in a counterclockwise direction with respect to platform 150.

In an embodiment, platform 150 includes left receipt 350. Platform may also include right receipt 370, which may be opposite left receipt 350, as shown in FIG. 3. Each receipt may be sized and shaped to receive and retain one of the plurality of flanged bushings 190 of base frame 110, as shown in FIG. 1. For example, flanged bushing 190*a* may be received within left receipt 350, thereby retaining flanged bushing 190*a* against platform 150, and consequently coupling platform 150 to base frame 110. It is appreciated that a singular receipt, such as left receipt 350, may be used to retain platform 150 against base frame 110; however, it is also appreciated that a pair of receipts, such as left receipt 350 and right receipt 370, or multiple receipts, may be used.

In a preferred embodiment, left receipt 350 and left platform latch bracket 160 are separated by a distance of approximately 10" (±1.5") to capture flanged bushings 190*a*, 190*b*, with a similar distance between right receipt 370 and right platform latch bracket 360. However, it is appreciated that the distance separating left receipt 350 and left platform latch bracket 160 (as well as right receipt 370 and right platform latch bracket 360) corresponds to the distance between flanged bushings 190, such that left receipt 350 and left platform latch bracket 160 may receive and retain flanged bushings 190a, 190b. Accordingly, it is appreciated that other distances are possible depending on the use.

Figure 4:
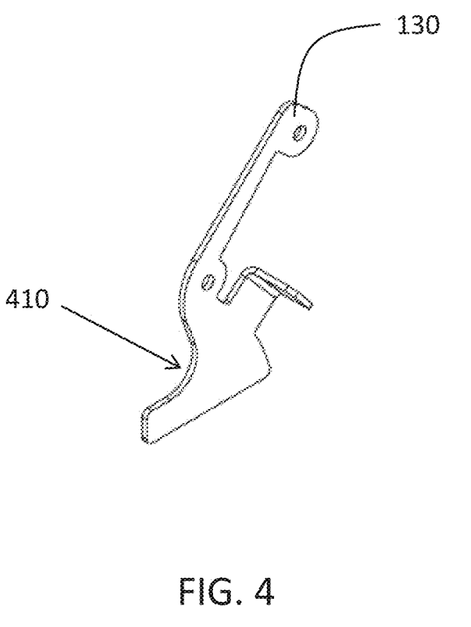
FIG. 4 is a perspective view of a base latch bracket, a component of the base frame, in accordance with the present invention.
Figure 5:
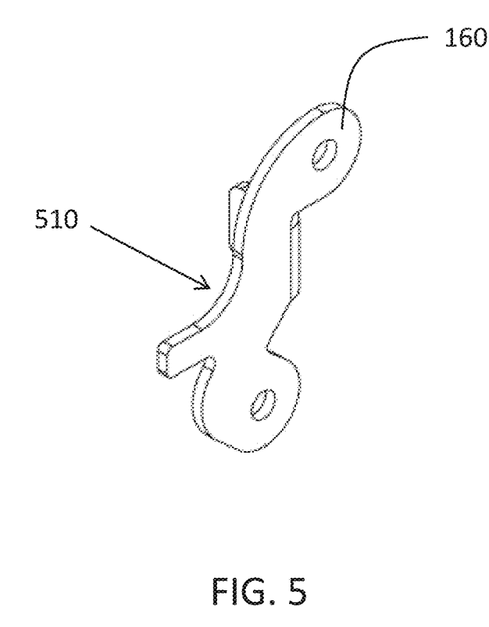
FIG. 5 is a perspective view of a platform latch bracket, a component of the platform, in accordance with the present invention.

FIGS. 4 and 5 further depict components of the locking system for securing a storage case to a vehicle in detail. An embodiment of base latch bracket 130 is shown in FIG. 4, including female receipt 410. Female receipt 410 may be sized and shaped to receive a male member of a vehicle, such as a head of a screw or bolt, which may function as an attachment point on a motorcycle. Accordingly, base latch bracket 130, being pivotably coupled to base frame 110, may pivot to clamp against and retain the attachment point against female receipt 410, thereby securing base frame 110 against a motorcycle or other vehicle.

Similarly, platform latch bracket 160, as shown in FIG. 5, includes female receipt 510, which may be sized and shaped to receive flanged bushing 190 of base frame 110. Platform latch bracket 160, being pivotably coupled to platform 150, may pivot to clamp against and retain flanged bushing 190, thereby securing platform 150 against base frame 110. Together with receipts 350, 370, base latch bracket 130 and platform latch bracket 160 may form a triple-locking system to securely and detachably couple storage case 155 to a vehicle, such as a motorcycle. Said another way, base latch bracket 130 forms a first lock by securely coupling base frame 110 to a vehicle; platform latch bracket 160 forms a second lock by securing platform 150 to base frame 110; and receipt 350 forms a third lock by receiving and retaining flanged bushing 190, further securing platform 150 to base frame 110.

Figure 6:
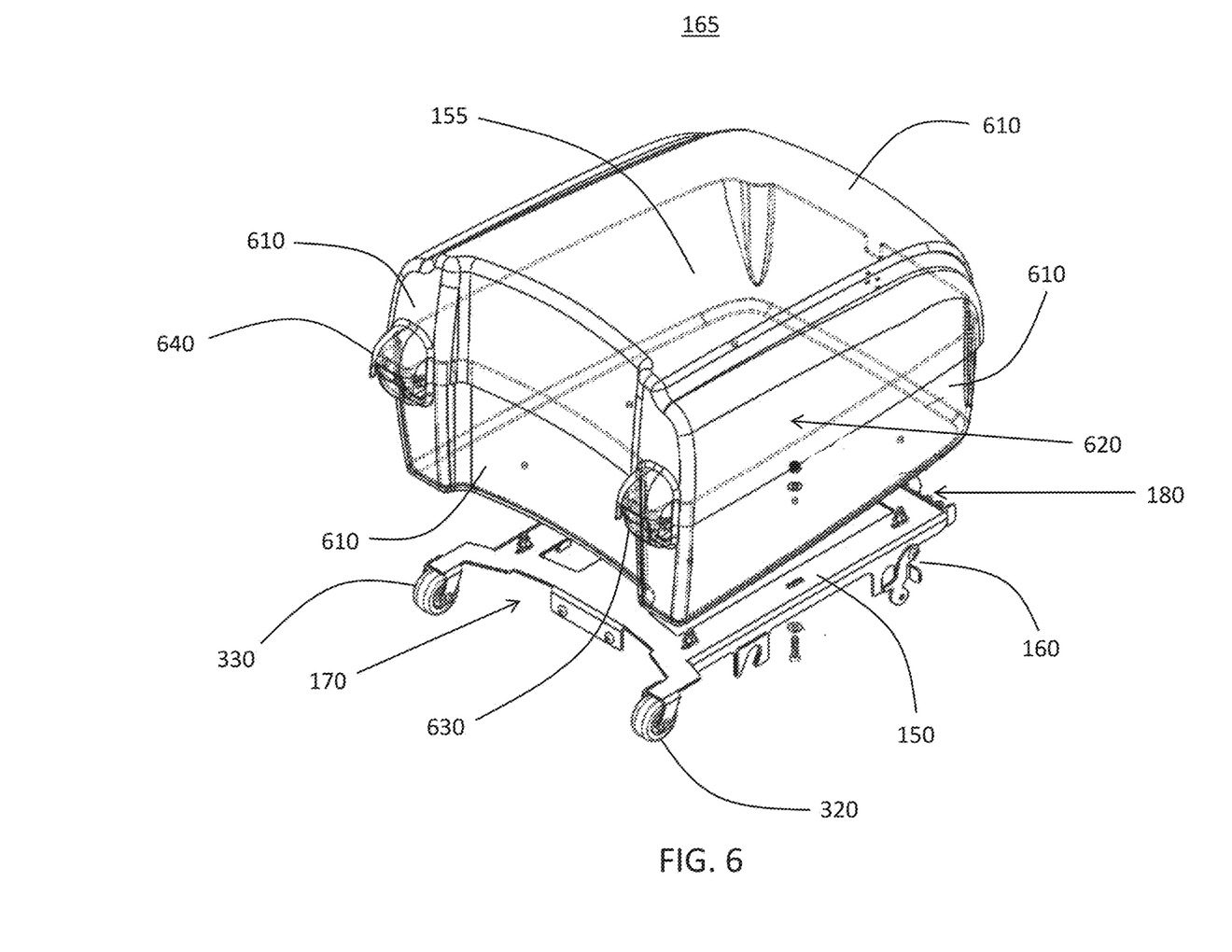
FIG. 6 is an exploded perspective view of a transportable suitcase assembly, including a platform and a storage case.

FIG. 6 shows transportable storage case assembly 165 in greater detail. Storage case 155 includes a plurality of exterior walls 610, which define interior storage compartment 620. In an embodiment, storage case 155 includes at least one wheel, and preferably includes at least a pair of wheels disposed on opposite sides of wheeled end 170. As shown in FIG. 6, storage case 155 may include a first caster wheel 630 and a second caster wheel 640. First caster wheel 630 may be substantially collinear with first wheel 320, and second caster wheel 640 may be substantially collinear with second wheel 330. To increase stability when transportable storage case assembly 600 is in an upright position (i.e., when top surface 310 of platform 150 is substantially perpendicular with respect to a ground surface), first caster wheel 630 and second caster wheel 640 may be collinear with respect to one another. Caster wheels 630, 640 may be swivel casters or may be rigid casters, and may be made from plastic, rubber, cast iron, aluminum, stainless steel, polyurethane, or any other material capable of lateral translation along a ground surface. Instead of caster wheels 630, 640, storage case 155 may include alloy wheels, bicycle wheels, omni wheels, or other types of wheels that can be coupled to storage case 155 to provide for translational motion.

Figure 7A:
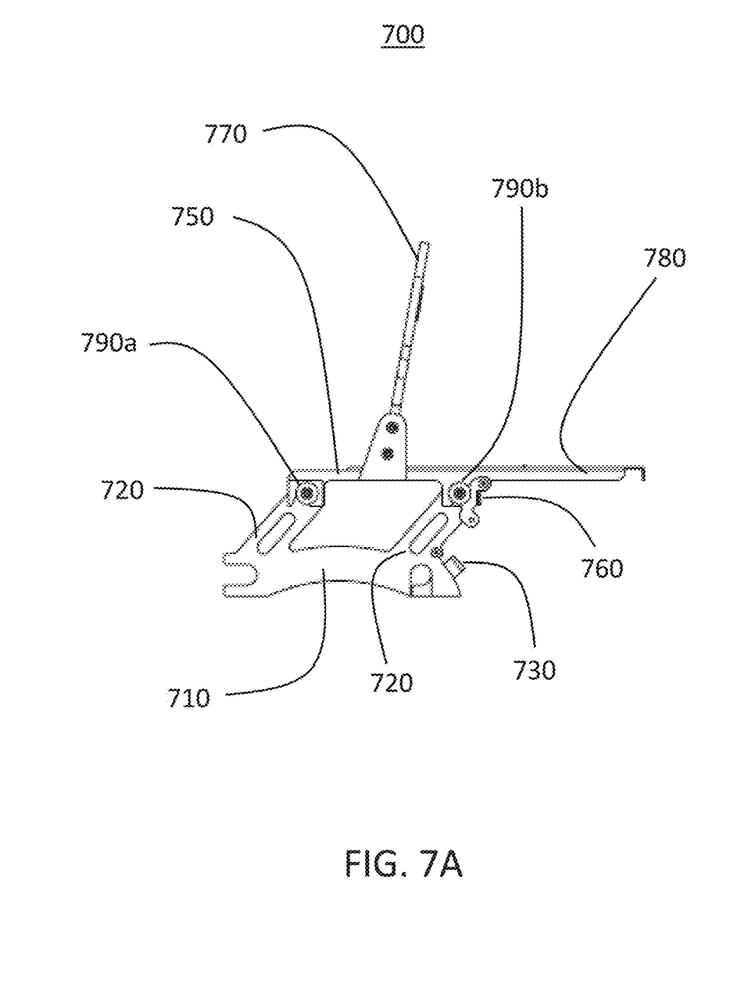
FIG. 7A is an elevation view of a universal motorcycle storage case mounting assembly, with a storage bench detachably coupled to a base frame, in accordance with an embodiment of the present invention.
Figure 7B:
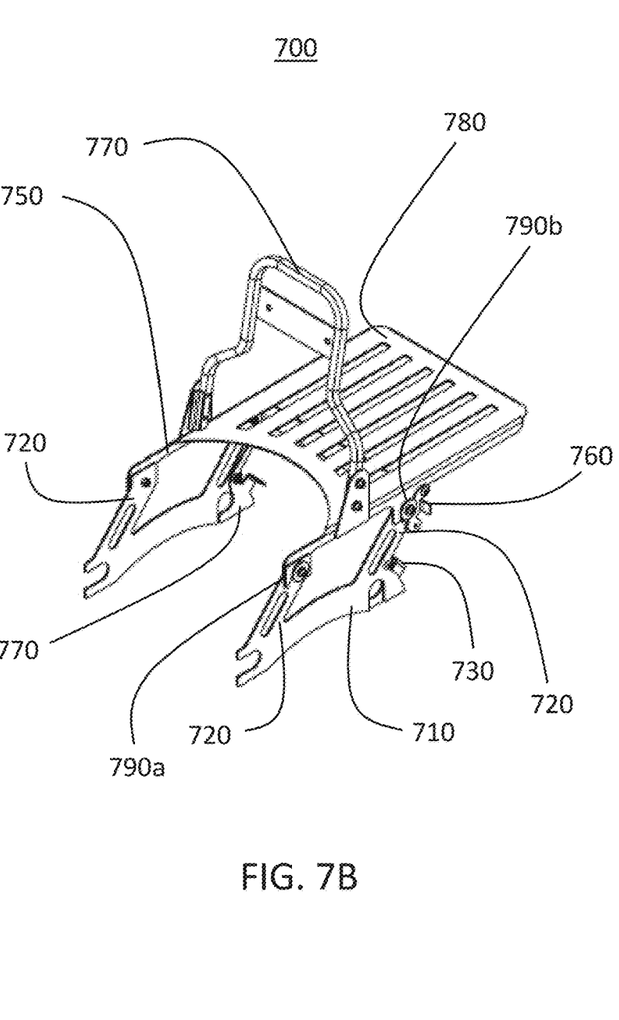
FIG. 7B is a perspective view of the universal motorcycle storage case mounting assembly of FIG. 7A.

As shown in FIGS. 7A and 7B, an embodiment of universal motorcycle storage case mounting assembly 700 includes base frame 710, which is similar to base frame 110—including vertical struts 720, base latch bracket 730, platform 750, platform latch bracket 760, and flanged bushings 790a, 790b. Base frame 710 may securely couple to a vehicle, such as a motorcycle, through base latch bracket 730, similar to the coupling mechanism of base latch bracket 130. Likewise, platform 750 may securely couple to base frame 710 through platform latch bracket 760 and flanged bushing 790b, like the coupling mechanism of platform latch bracket 160. Platform 750 may also include one or more receipts sized and shaped to receive and retain flanged bushing 790a, further securing platform 750 against base frame 710.

An embodiment of universal motorcycle storage case mounting assembly 700 includes storage bench 780 extending in a direction away from a vehicle, such as a solo-seat motorcycle, providing for additional storage space. For example, storage bench 780 may couple to a back end of a vehicle, such as behind a motorcycle seat or behind sissy bar 770, and may extend in a direction away from the vehicle. Storage bench 780 may also form a secondary seat on a vehicle, such as a motorcycle, allowing for a passenger to ride on the motorcycle; alternatively, a storage case or other container may be disposed on storage bench 780, providing for a storage platform. Storage bench 780 may be utilized in addition to storage case 155, described above, or may form a separate structure. In an embodiment, storage bench 780 and sissy bar 770 form a singular structure for use with two riders, allowing a passenger to sit behind a driver and utilize storage bench 780 as a seat and sissy bar 770 as a backrest. In an embodiment, platform 750 includes a wheeled end opposite a handle end, and may include a pull bar, similar to platform 150. As such, storage bench 780 may form a removable platform that provides for the wheeled transportation of a storage case, such as a suitcase or a bag, which may be functionally similar to transportable storage case 165.

Figure 8:
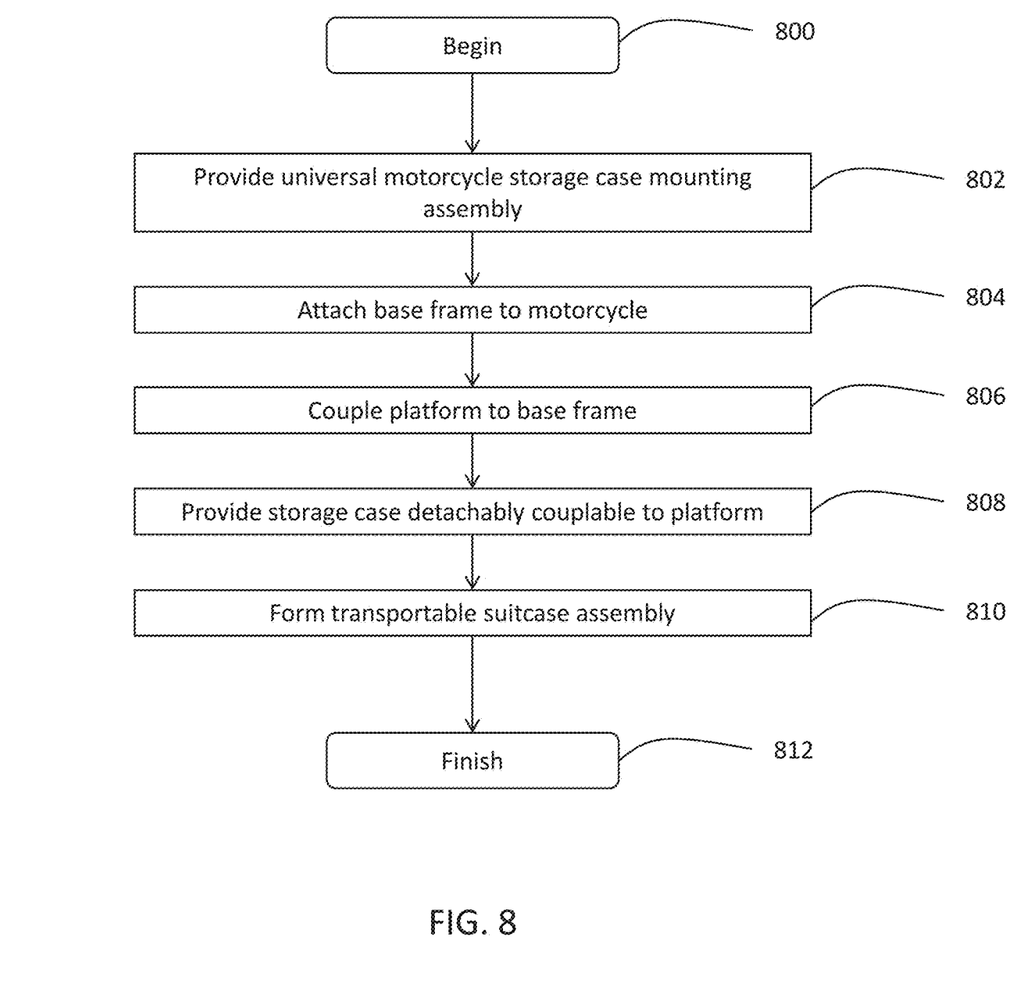
FIG. 8 is a flow chart diagram depicting a method of securing a detachable storage case to a motorcycle.

Referring now to FIG. 8, in conjunction with FIGS. 1-6, an exemplary process-flow diagram is provided, depicting a method of securing a detachable storage case to a vehicle, such as a motorcycle. The steps delineated in the exemplary process-flow diagram of FIG. 8 are merely exemplary of a preferred order of securing a storage case to a vehicle, and the steps may be carried out in another order, with or without additional steps included therein.

The method of securing a detachable storage case to a motorcycle begins at step 800 and proceeds to step 802, during which a universal motorcycle storage case mounting assembly 100 is provided, which may include the components discussed above. The method then proceeds to step 804, which includes attaching base frame 110 to a motorcycle by clamping base latch bracket 130 against an attachment point on the motorcycle. Base latch bracket 130 may receive the attachment point, and subsequently pivot to retain the attachment point against base frame 110.

Platform 150 couples to base frame 110 at step 806. During this step, platform latch bracket 160 receives flanged bushing 190b on base frame 110, and platform latch bracket 160 may be pivoted to clamp against flanged bushing 190b, thereby securing base frame 110 against platform 150. Flanged bushing 190a may also be received within receipt 350 of platform 150, with receipt 350 retaining flanged bushing 190a against platform 150.

During step 808, storage case 155 is detachably coupled to platform 150 along upper surface 310. As such, storage case 155 may rest on upper surface 310, being coupled to platform 150. The coupling of storage case 155 to platform 150 forms transportable storage case assembly 165 at step 810. Transportable storage case assembly 165 may securely couple to base frame 110, particularly during transportation to a destination. Transportable storage case assembly 165 may be detached from base frame 110, allowing for the removal of storage case 155 from base frame 110. In an embodiment, platform 150 may include wheeled end 170, including wheels 320, 330, opposite handle end 180, including pull bar 340. As such, transportable storage case assembly 165 may be operably configured to translate along a ground surface by holding pull bar 340 and utilizing wheels 320, 330. The method may terminate at step 812.

Figure 9A:
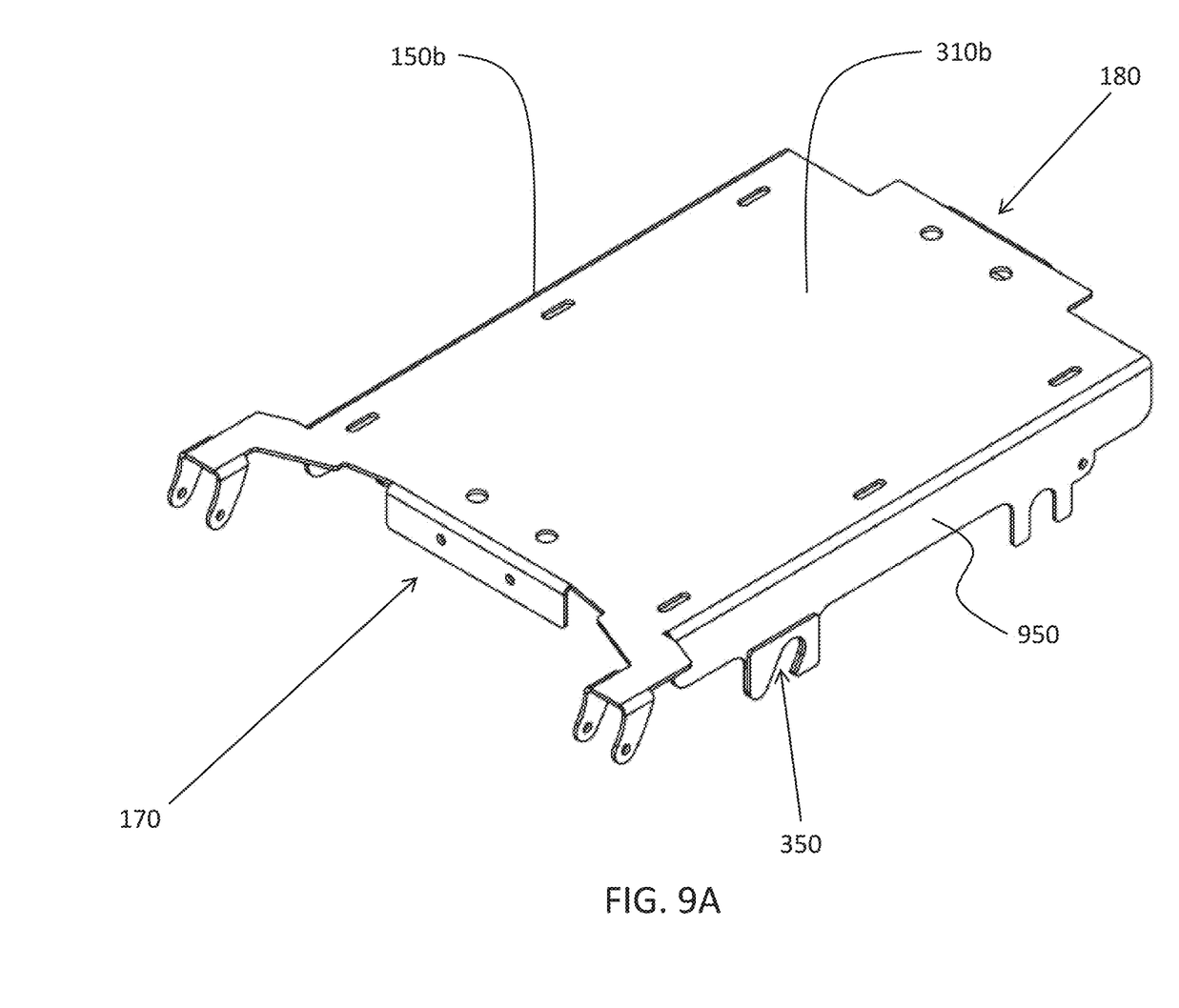
FIG. 9A is a perspective view of an alternative embodiment of the platform of FIG. 3.
Figure 9B:
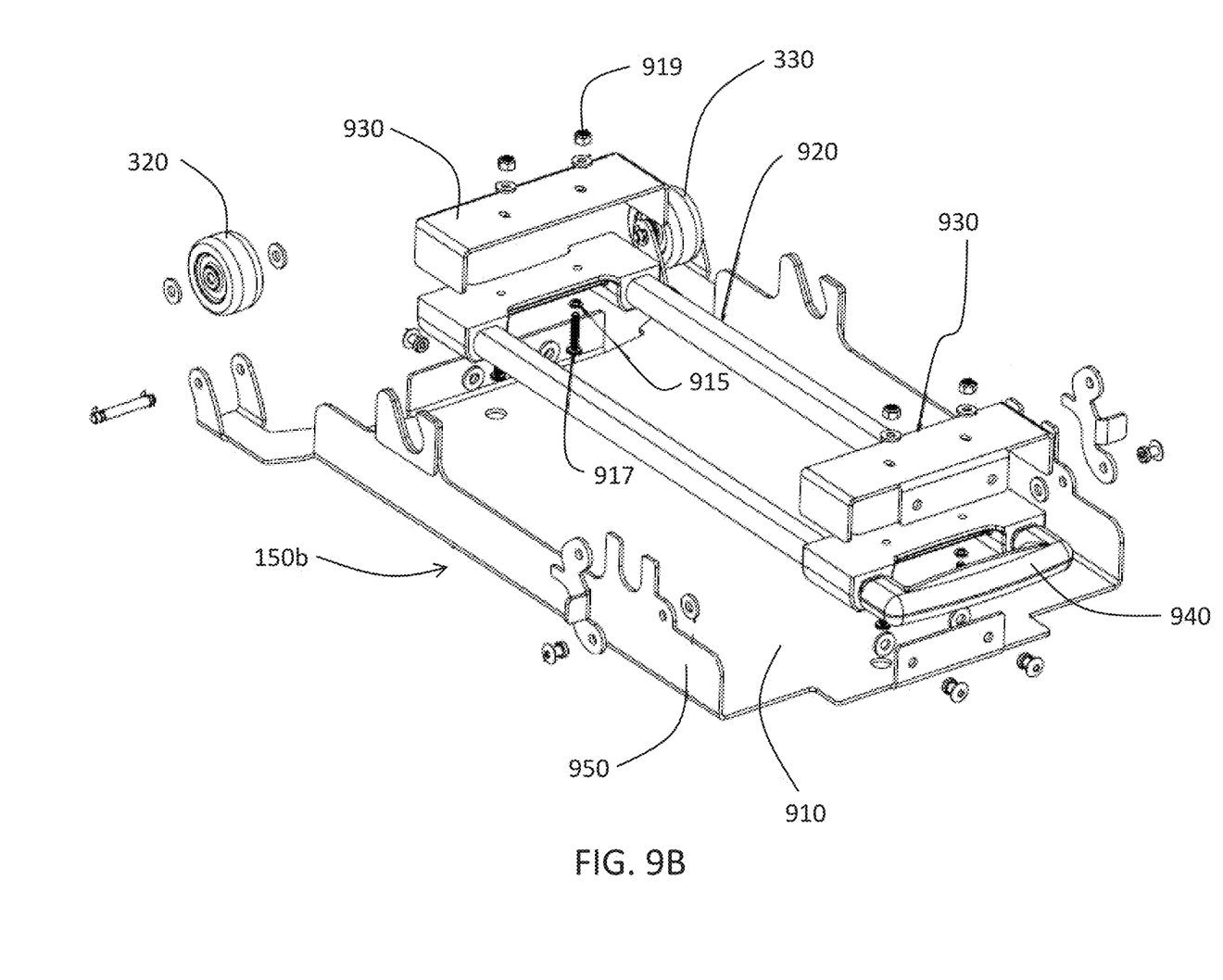
FIG. 9B is an exploded perspective view of the platform of FIG. 9A, depicting a bottom surface and a telescoping handle mechanism thereof.
Figure 9C:
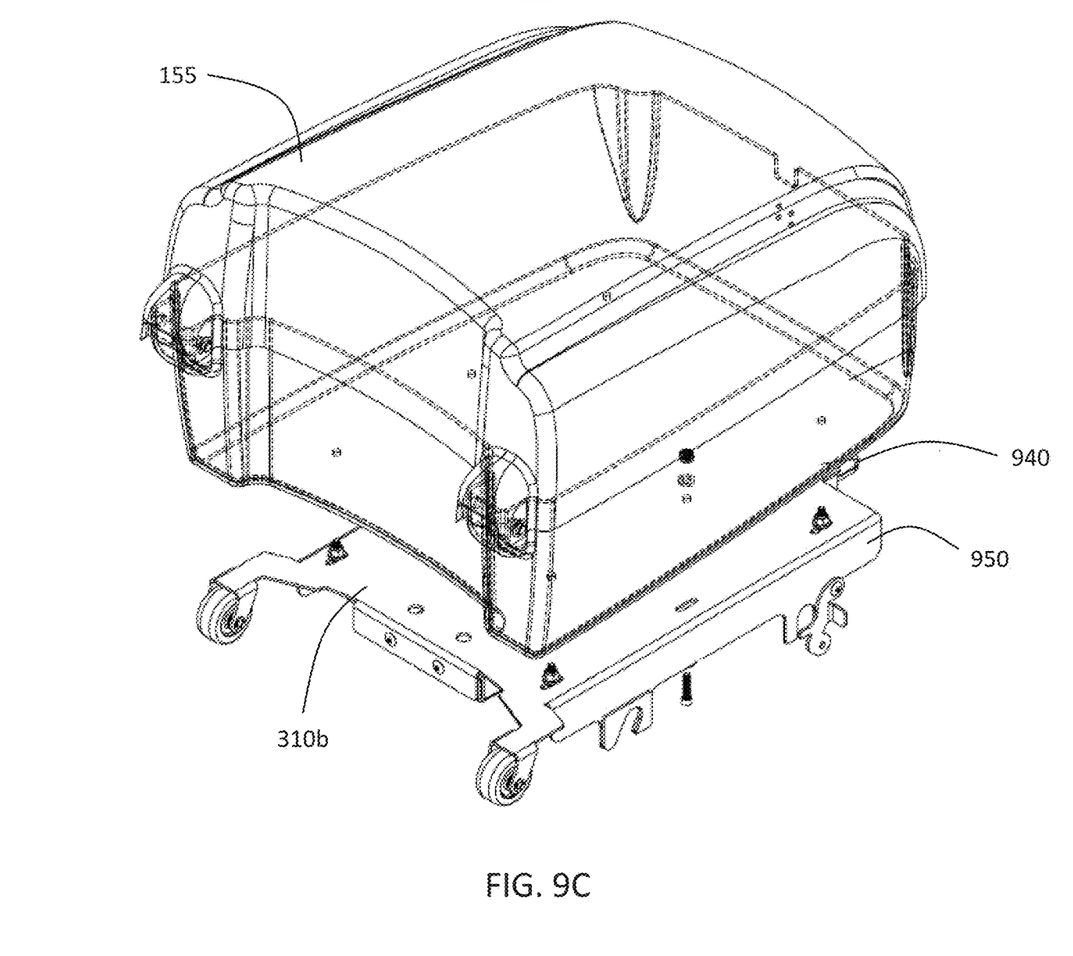
FIG. 9C is an exploded perspective view of a transportable suitcase assembly, including the platform of FIG. 9A and a storage case.

FIGS. 9A-9C include depictions of an alternative embodiment of platform 150b, which is attachable to base frame 110 in the same way that platform 150 attaches to base frame 110, as discussed in detail above. Specifically, top surface 310b is shown in FIG. 9A, and is disposed opposite bottom surface 910 shown in FIG. 9B. Top surface 310b is largely solid and continuous, other than small apertures disposed within top surface 310b as attachment mechanisms. The continuity of top surface 310b aids in receiving storage case 155 thereon. In addition, as shown in FIG. 9B, bottom surface 910 is also largely solid, forming a continuous surface opposite top surface 310b, other than the small apertures disposed within top surface 310b that are also formed within bottom surface 910. In addition, opposing sidewalls 950 extend in a direction away from each of top surface 310b and bottom surface 910, with receipts 350, 370 formed within sidewall 950, such that sidewall 950 is a base frame-facing component of platform 150b.

As shown in FIG. 9B, platform 150b includes a telescopable pull bar assembly, similar to that depicted in FIG. 3 and described above. The assembly resides adjacent to bottom surface 910 between opposing sidewalls 950, such that the assembly resides between platform 150b and base frame 110 during use. The assembly includes a plurality of elongated telescopable members 920 secured to pull bar 940, such that pull bar 940 is extendable in a direction away from telescopable members 920 for use during transportation. To prevent detachment of telescopable members 920 from platform 150b, an opposing set of housings 930 secure telescopable members 920 in place against platform 150b. In an embodiment, the securing of each housing 930 is accomplished via screw 917, washer 915, and bolt 919; however, it should be appreciated that similar mechanical attachment mechanisms, such as pin-and-hole mechanisms or other receipt mechanisms, can be used in alternative embodiments. In addition, while FIG. 9B shows only one such attachment mechanism on a single housing 930, it should be understood that each housing 930 includes at least one such mechanism thereon. Moreover, wheels 320, 330 secure to platform 150b; as such, the entirety of platform 150b, including the telescopable pull bar assembly, can detach from base frame 110 to be used as a ground transportation device for a storage case stored thereon. FIG. 9C shows the assembled transportable storage case assembly 965, similar to assembly 165 shown in FIG. 6.

Glossary of Claim Terms

Attachment point: is a structure that is sized and shaped to couple to another structure. An attachment point may be a male member capable of being received by a female member, such as the head of a bolt or screw, or may be a female member capable of receiving a male member.

Base frame: is a structure that is operably configured to securely attach to a vehicle, such as a motorcycle, and to a platform.

Female receipt: is an aperture or similar structure that is sized and shaped to receive a male member, such as the head of a screw or bolt.

Handle: is a structure that can be grasped and held by a user.

Lock: is a device configured to securely retain or couple two components together.

Motorcycle: is a wheeled vehicle, which may include a motor. As used herein, "motorcycle" can encompass a variety of vehicles, including a bicycle, unicycle, tricycle, car, truck, van, or any other vehicle.

Platform: is a structure that is operably configured to detachably and securely couple to a base frame.

Storage case: is a bag, suitcase, box, or other container, which can be made of a hard-shall material or of a cloth material.

Telescopable: a structure that can translate both away from and toward another structure, with the structures in either direct or indirect contact.

Universal motorcycle storage case mounting assembly: is a mounted assembly that can be retrofitted onto a variety of surfaces, including vehicles, such as motorcycles.

Wheel: is a substantially rounded structure capable of lateral translation along a ground surface. The wheel may be a swivel caster, rigid caster, alloy wheel, bicycle wheel, omni wheel, or the like, and may be made of plastic, rubber, cast iron, aluminum, stainless steel, polyurethane, or any other material capable of lateral translation.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A transportable storage case assembly comprising:
    a platform including:
        an upper surface opposite a lower surface, and a pair of opposing sidewalls extending perpendicularly away from the lower surface, with at least one receipt defined by each of the pair of opposing sidewalls, the at least one receipt at least partially enclosed by a platform latch bracket;
        a wheeled end including a pair of wheels; and
        a handle end including a pull bar that exists in a parallel plane with respect to the platform; and
    a storage case detachably coupled to the upper surface of the platform.

2. The transportable storage assembly of claim 1, further comprising:
    a base frame coupled to the platform, the base frame being detachably couplable with a vehicle and having:
        at least one base latch bracket operably configured to securely attach to the vehicle; and
        a pair of vertical struts extending in a direction away from the at least one base latch bracket, each vertical strut including a bushing;
    wherein at least one of the receipts on the lower surface of the platform receives one of the bushings, and wherein at least one of the platform latch brackets secures the bushing within the receipt.

3. The mounting assembly of claim 2, wherein:
    the base frame includes a left base latch bracket opposite a right base latch bracket, each base latch bracket operably configured to secure to opposite sides of the vehicle.

4. The mounting assembly of claim 2, wherein:
the platform includes a left platform latch bracket opposite a right platform latch bracket, each platform latch bracket operably configured to secure to opposite sides of base frame.

5. The mounting assembly of claim 2, wherein the base frame further comprises:
a second pair of vertical struts extending in a direction away from the base latch bracket, each vertical strut including a bushing operably configured to be received by the receipt or retained by the platform latch bracket.

6. The mounting assembly of claim 1, wherein:
the pull bar is telescopable with respect to the platform.

7. The mounting assembly of claim 1, wherein the storage case further comprises:
a set of exterior walls defining an interior storage compartment.

8. The mounting assembly of claim 1, wherein the storage case further comprises:
a pair of caster wheels.

9. The mounting assembly of claim 1, wherein the platform further comprises:
a bench extending in a direction away from a motorcycle seat when mounted on a motorcycle.

10. A locking system for securing a storage case to a vehicle, the system comprising:
a base frame including:
at least one base latch bracket operably configured to securely attach to the vehicle, the at least one base latch bracket at least partially enclosing a base receipt, the base receipt adapted to receive a male attachment point on a vehicle, such that the least one base latch bracket is adapted to secure the male attachment point within the base receipt; and
a pair of vertical struts extending in a direction away from the at least one base latch bracket, each vertical strut including a bushing; and
a platform including an upper surface opposite a lower surface, and a pair of opposing sidewalls extending perpendicularly away from the lower surface, with at least one platform receipt defined by each of the pair of opposing sidewalls, each platform receipt at least partially enclosed by a platform latch bracket,
wherein at least one of the platform receipts receives one of the bushings, and wherein at least one of the platform latch brackets secures the bushing within the platform receipt.

11. The locking system of claim 10, wherein:
the at least one base latch bracket is pivotably coupled to the base frame, such that the at least one base latch bracket clamps the male attachment point within the at least one base receipt.

12. The locking system of claim 10, wherein:
the at least one platform latch bracket is pivotably coupled to the platform, such that the at least one platform latch bracket clamps one of the bushings within the at least one platform receipt.

13. The locking system of claim 10, wherein the platform further comprises:
a wheeled end including a pair of wheels; and
a handle end including a pull bar that exists in a parallel plane with respect to the platform.

14. The locking system of claim 13, wherein:
the pull bar is telescopable with respect to the platform.

15. The locking system of claim 10, further comprising:
a storage case coupled to the platform, forming a transportable storage case assembly.

16. The locking system of claim 15, wherein:
the transportable storage case assembly is removably attachable to the base frame, allowing the transportable store case assembly to freely attach and detach from the base frame.

* * * * *